United States Patent [19]

Kashmerick et al.

[11] 4,423,544
[45] Jan. 3, 1984

[54] METHOD OF MAKING COMPOSITE GASKET

[75] Inventors: Gerald E. Kashmerick, Lindenhurst; Gerald A. Rosenquist, Montgomery, both of Ill.

[73] Assignee: Felt Products Mfg. Co., Skokie, Ill.

[21] Appl. No.: 318,947

[22] Filed: Nov. 6, 1981

[51] Int. Cl.³ .............................................. B23P 15/06
[52] U.S. Cl. .................................. 29/527.2; 29/156.6; 277/235 A; 277/235 R; 277/DIG. 6
[58] Field of Search .................... 29/402.02, 156.6 US, 29/521, 527.2; 264/266; 277/228, 235 A, DIG. 6, 235 R

[56] References Cited

U.S. PATENT DOCUMENTS 2,251,211  7/1941  Armstrong ...................... 29/156.6 X
4,209,177  6/1980  Hall ....................................... 277/230

FOREIGN PATENT DOCUMENTS 2031074A  4/1980  United Kingdom .

*Primary Examiner*—Howard N. Goldberg
*Assistant Examiner*—V. K. Rising
*Attorney, Agent, or Firm*—Dressler, Goldsmith, Shore, Sutker & Milnamow, Ltd.

[57] ABSTRACT

A method of making a composite gasket. A composite gasket is formed from an annular coiled strip of heat-resistant core material having a metallic tanged core and a facing layer, as of a mica-based material, integrated with the strip. The coil is placed in a first die and axially compressed under a relatively low pressure into a preform having a plurality of crevices in its face. The preform and a temperature-resistant sealing material, such as expanded graphite, are placed in a second die and the graphite and preform are axially compressed under high pressure to integrate the sealing material with the preform and to mechanically interlock the sealing material with crevices in the surface of the core material. The preform and sealing material are substantially deformed during the second axial compression to provide an improved composite gasket.

13 Claims, 10 Drawing Figures

METHOD OF MAKING COMPOSITE GASKET

TECHNICAL FIELD

Exhaust rings for sealing articulated joints in automotive exhaust systems are commonly used. Such joints are necessary in certain vehicles due to relative movement encountered between the engine exhaust manifold outlet and the exhaust header. In vehicles in which transversely mounted engines are used, that relative motion typically is relative rotational movement which, in designs used by automobile manufacturers, uses a ball and socket sealing configuration to accommodate the rotational movement. Complementary exhaust rings are therefore necessary to accommodate that movement.

Such an articulated joint is most commonly provided between the manifold outlet and the exhaust header. Most frequently a sealing ring is interposed therebetween and the ring is seated on either the manifold outlet or the exhaust header, and an outer face of the exhaust ring contacts a complementary, relatively movable sealing surface on the other member. Desirably the sealing surface is partispherical, and the outer exhaust ring face is of a generally complementary parti-spherical configuration.

The ring face and sealing surface must accommodate relative rotational movement therebetween, such as that resulting from the motion of a transversely mounted engine, all while maintaining good sealing contact. Because such relative movement can result in abrasive rubbing, the sealing surfaces should also accommodate such rubbing without deleterious erosion. As such, it is desirable that one or both of the contacting parti-spherical surfaces be of an abrasion resistant material or have anti-friction or lubricating characteristics or both.

BACKGROUND OF THE INVENTION

A variety of approaches to solving the problem of providing an effective, long-lived seal in such an articulated joint have been suggested, and as the amount of relative motion encountered increased, the sealing problems became more acute and the use of improved exhaust ring assemblies, such as those using materials having lubricating characteristics, were suggested.

For example, U.S. Pat. No. 4,209,177 suggests a compressed woven fabric ring, having fillers, such as asbestos or mica, for use in articulated exhaust system joints. U.K. Patent Application No. 2031074A published on Apr. 16, 1980 suggests an exhaust ring formed of a knitted wire mesh and a refractory material such as graphite or mica. In that patent application a sheet of refractory material, such as mica, is placed within a sleeve of wire mesh and the assembly is wound into a cylindrical preform. The preform is then axially compressed into a seal of desired shape.

Exhaust ring gaskets made in accordance with the method of this invention are not only substantially less expensive to make than most of the prior art suggestions for exhaust system seals, but are highly effective, especially in exhaust systems having transversely mounted engines where relative motion of up to eight degrees is regularly encountered. Indeed, the bulk of the material of which the ring is made may be a relatively low-cost material having suitable and appropriate strength, compressibility and temperature-resistance characteristics, while a selected material of suitable lubricity, abrasion resistance, and temperature resistance may be used for the outer surface.

SUMMARY OF THE INVENTION

In accordance with this invention an improved method forming a high temperature resistant sealing ring is provided. The method includes the steps of forming a loose generally cylindrical coil of a first height from a strip of heat-resistant material, placing the coil in a first die and axially compressing the coil at a first lower pressure into an annular preform of a second height and having a plurality of macro and micro crevices in a surface thereof.

The preform in then positioned in a second die and temperature resistant sealing material is juxtaposed with said preform in said second die. The preform and sealing material are then axially compressed under high pressure to force the sealing material into the crevices in the preform surface, to reduce the height of the cylindrical preform to a third height, to substantially deform the preform and the sealing material, and to form a smooth sealing material surface at the preform surface, all to provide an improved sealing ring.

Preferably the loose coil is formed from a strip of heat-resistant material having a tanged central core and at least one facing layer of a temperature resistant inorganic material secured thereto, and the annular preform is formed in the first die to provide a base intersecting the preform surface, the base having downwardly projecting foot means centrally of the base. In a preferred mode, the sealing material is formed into a second preform, and the second preform is positioned in the second die about the first preform, wherein the axial compression in the second die forms a smooth parti-spherical sealing material surface on the outer surface of the sealing ring, and on at least a portion of the base of the sealing ring between the outer surface and the location at which the foot means was positioned. Desirably the sealing material preform is a loose coil of graphite.

In the preferred embodiment the strip comprises a flat, tanged metallic core to which the inorganic facing is secured, and the preform comprises a buckled metallic core and a buckled facing layer after the first axial compression and in which, after the second compression, the metallic core is further upset and displaced irregularly.

The improved sealing ring produced in accordance with this invention is especially adapted for use in an articulatable joint between members which oscillate relative to each other. The sealing ring, which may be an exhaust ring, comprises a first sealing surface adapted to be sealingly secured with a first member of an articulatable joint and a second sealing surface adapted to be sealingly secured with a second member of an articulatable joint, the second sealing surface and a second member being adapted to oscillate relative to each other.

The sealing ring comprises a central core material and an integrated surfacing, the central core material comprising an upset, vertically displaced sheet material compressed randomly and buckled and displaced irregularly, and defining crevices at a core surface thereof, the surfacing defining a smooth second sealing surface and a random, irregular inner surface substantially conforming to the central core surface, thereby mechanically linked to the surfacing and the central core surface to each other.

Preferably the sheet material comprises a thin metallic core which is tanged and which has a thicker inorganic facing secured thereto, with at least some of said tangs engaging the surfacing. In the preferred embodiment the surfacing covers an external surface of the sealing ring, the external surface is parti-spherical, and the surfacing is graphite.

Further objects, features and advantages of this invention will become apparent from the following description and drawings of a presently preferred embodiment of the present invention.

BRIEF DESCRIPTION OF THE DRAWINGS

FIG. 9 is an enlarged cross-sectional view taken substantially along line 9—9 of FIG. 5; and FIG. 10 is an enlarged cross-sectional view taken substantially along line 10—10 of FIG. 8.

DESCRIPTION OF AN ILLUSTRATIVE EMBODIMENT

Figure 1:
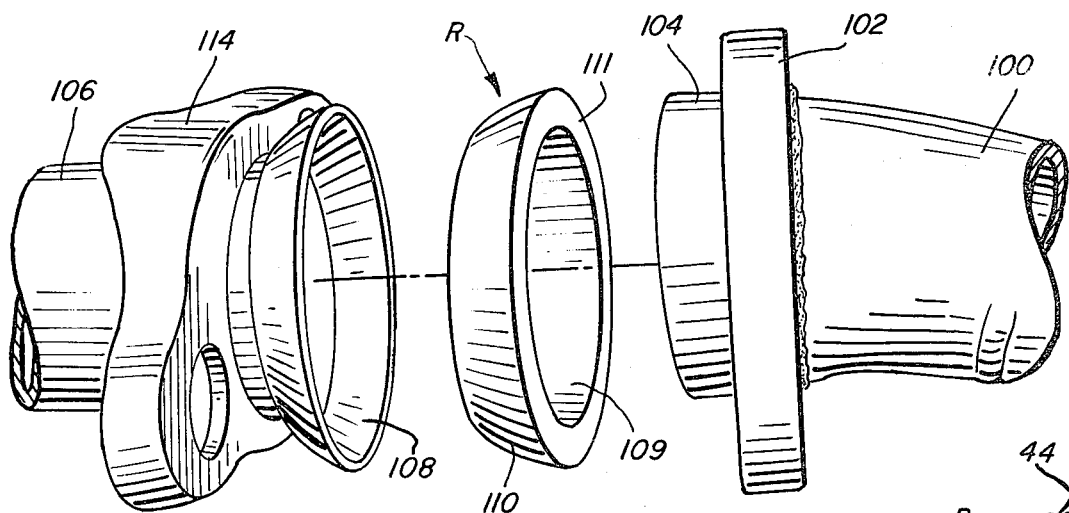
FIG. 1 is an exploded perspective view of an exhaust ring made in accordance with this invention positioned between a manifold outlet and an exhaust header, thereby to provide articulatable joint.
Figure 2:
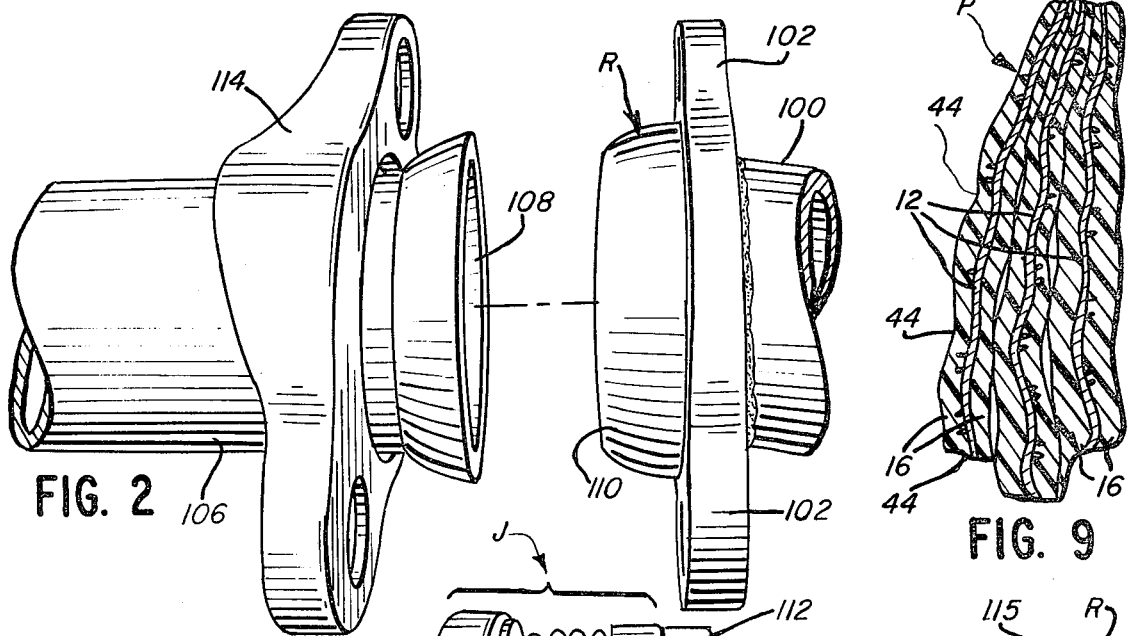
FIG. 2 is a view similar to FIG. 1 in which the exhaust ring is seated on the manifold outlet.
Figure 3:
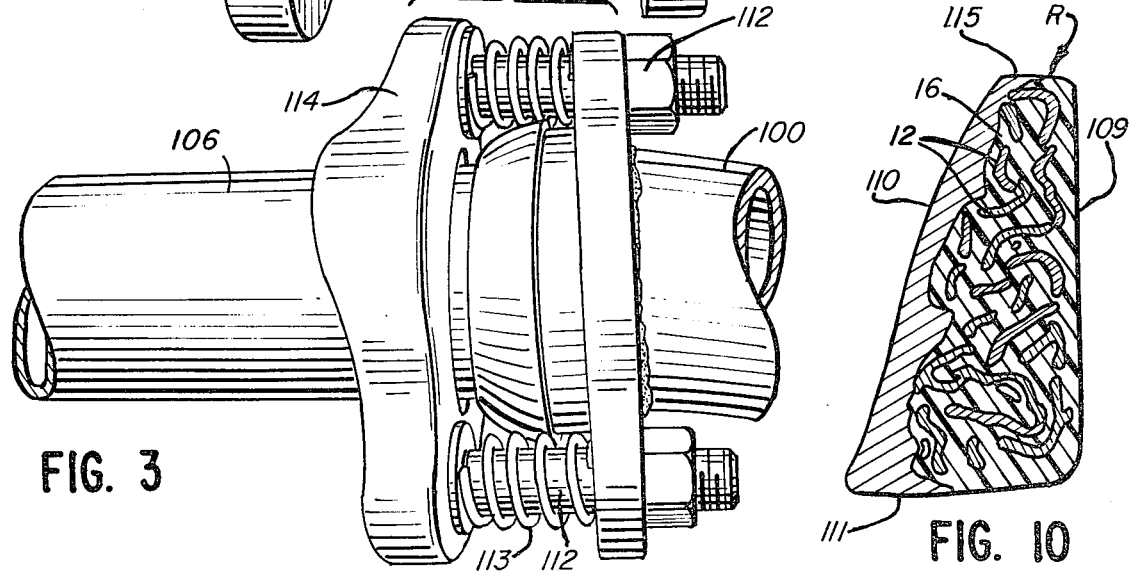
FIG. 3 is a view similar of FIG. 1 in which the parts are assembled in their operative, articulatable relationship.
Figure 4:
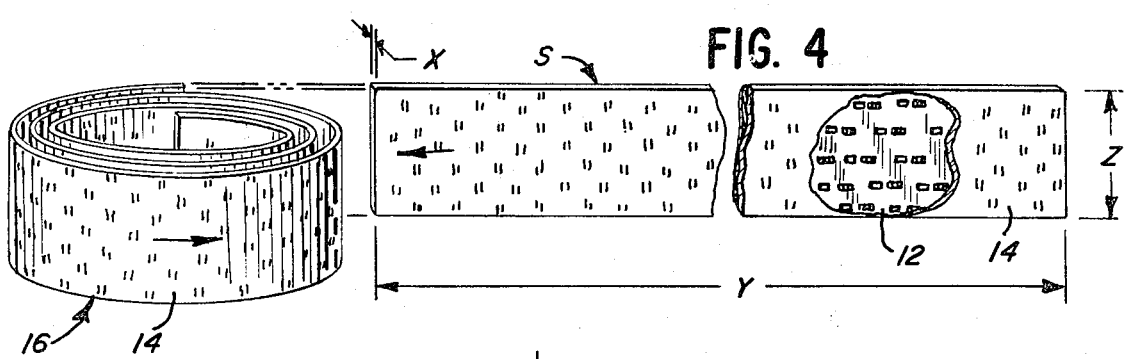
FIG. 4 shows a strip used to make a coil from which a preform for the exhaust ring is adapted to be formed.

FIGS. 1 to 3 of the drawings illustrate an articulatable joint assembly J in an automobile, such as one for the exhaust system of a six-cylinder automobile engine, positioned transversely of the vehicle. As such, the engine and associated manifold will move with a fore and aft motion relative to the longitudinally disposed exhaust pipe system to which the manifold outlet is secured. The engine (not shown) mounts a manifold outlet 100 having a clamping ring 102 and an exhaust ring seat 104. The confronting exhaust header 106 terminates in a parti-spherical sealing surface 108. The manifold outlet 100 and exhaust header 106 are adapted to be sealingly interconnected via a sealing member, such as by an exhaust ring R.

As seen in FIG. 2, exhaust ring R defines a cylindrical internal surface 109 complementary to the diameter of exhaust ring seat 104 and coaxial therewith and seated thereon. The ring R also defines a generally flat base 111 which is sealingly seated against the face of clamping ring 102, thereby to seal the manifold outlet to the ring R so that exhaust gases will pass directly into the exhaust header.

Thereafter, as shown by FIG. 3, the spherical sealing surface 108 of exhaust header 106 is brought into a juxtaposed relationship with the parti-spherical ring surface 110 which has been formed substantially to conform to the parti-spherical surface 108. The juxtaposed, sealing disposition between the sealing surfaces 108 and 110 is maintained, as via nuts and bolts 112 and interposed compression springs 113, which resiliently and flexibly secure clamping collar 114 to clamping ring 102. Because the sealing surfaces 108 and 110 are complementary and parti-spherical, and because the connection is resilient, limited relative rotational and oscillatory movement of the exhaust header with respect to the manifold outlet may be accommodated, all without interferring with the seal to be maintained between those surfaces, i.e., an effectively sealed, articulatable joint J in which the sealed parts may oscillate with respect to each other is provided for the exhaust gases.

A gasket assembly such as an exhaust ring R, of the present invention may be formed in the manner now to be described.

First, a desired high temperature-resistant core material of desired compressibility such as a strip S of heat-resistant material is provided. Strip S may comprise a perforated metallic core 12 having a series of tangs extending from each side, to which facings 14, preferably of an inorganic temperature-resistant material, are secured by the tangs. Desirably, the strip may be about 0.055 inch thick (dimension X), with a metallic core 12 about 0.009 inch thick and with each of the facings being of substantially equal thicknesses. The facings may be primarily of an inorganic sheet material which is mica based, although outer materials such as asbestos sheeting and other facings on one or both sides of the metallic core may be used as well. Although the facings may be predominately mica, they may also incorporate fiberglass, inorganic clays and minor amounts of organic materials such as cellulose and less than 10% of organic binders, such as rubber and thermosetting resins. Strip S may be cut from larger sheets of core material, which core material may be formed by compressively integrating slightly thicker sheets of facing material with the tanged core in a manner known in the art.

In this embodiment, strip S, which may be appoximately $\frac{7}{8}$ inch high (dimension Z) by about 21 $\frac{3}{4}$ inches in length (dimension Y), is then wound into a cylindrical coil configuration to form a loose coil or cylinder 16 of about 2.5 inches in diameter, i.e., a cylinder of about three complete turns. The height of the strip S, hence of coil 16, is in excess of 50% greater than that of the finished ring R.

The cylinder 16 is then placed in a die assembly 20 about a core 30 within a ring 32 on a die member 34. Die member 32 has an internal diameter about $\frac{1}{8}$ inch less than the finished exhaust ring R. Die member 34 defines an annular recess 36 to facilitate the formation of a downwardly projecting foot means, such as foot 42 which is about 0.1 inch x 0.1 inch in size, located generally centrally on the base of the preform P, for reasons to be explained.

A slidable circular die member 38 is then actuated, as hydraulically, to compress the cylinder 16 axially into the preform P which is of a height less than coil 16, but more than ring R. Desirably, a first lower pressure impressed by a load of about 4 tons will suitably compress the cylinder 16 into an annularly-shaped rough-surfaced preform P. Preform P is partially compressed sufficiently to maintain its integrity until further compression with the covering, and has a plurality of imperfections such as faults, crevices, voids and valleys 44, especially in the external surface 40. Thus, the surface 40 is rough, not smooth, thereby to promote adhesion and securance of the subsequently added covering to the selected surface 40 of the preform P.

Figure 5:
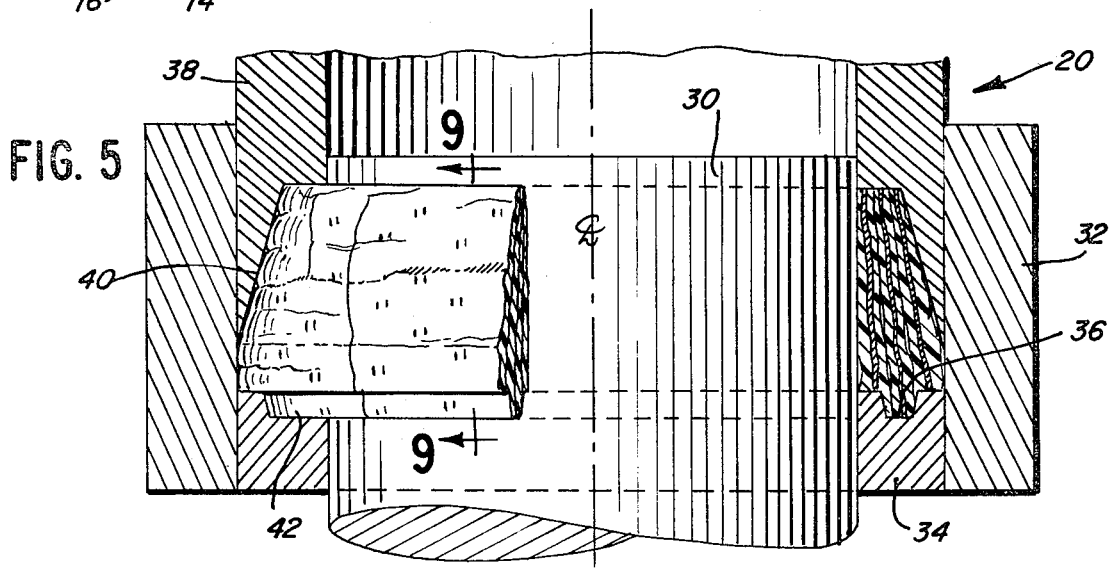
FIG. 5 shows the loose, generally cylindrical coil of FIG. 4 formed into the exhaust ring preform in a typical die in which it is adapted to be so formed.
Figure 6:
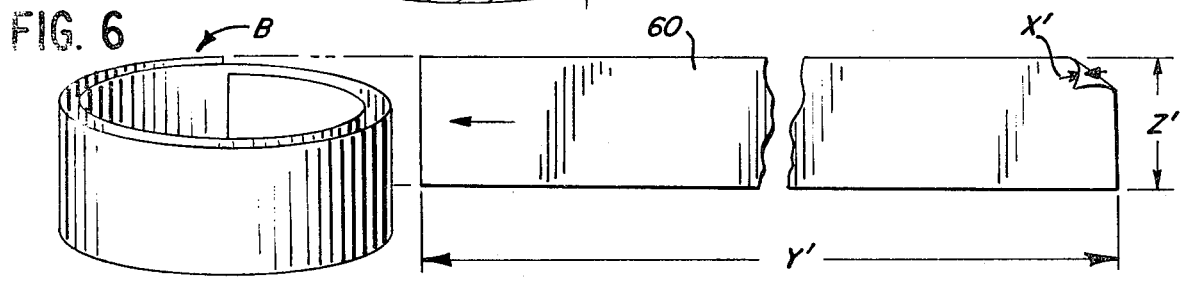
FIG. 6 shows a strip and loose coil of expanded graphite material which is to be assembled and integrated with the preform of FIG. 5.

Additionally, as illustrated by FIG. 5 and 9, the material of strip S is upset, and buckled and displaced from its generally straight vertical orientation in cylinder 16. Thus the sheet material is compressed randomly and displaced irregularly from its generally cylindrical plane. Further, the preform P is shaped so that when further compressed the preform material will be appropriately redistributed and the covering material will flow in predetermined, directed paths to strengthen potentially weak areas in the final covering and to provide distribution of the covering to those locations where it is desired or required.

The preform is then positioned in a second die assembly 50 having a central core 52, an external ring 54, and a generally flat die floor 56. A slidable die member 58 is positioned to act axially on the preform.

Figures 7, 8:
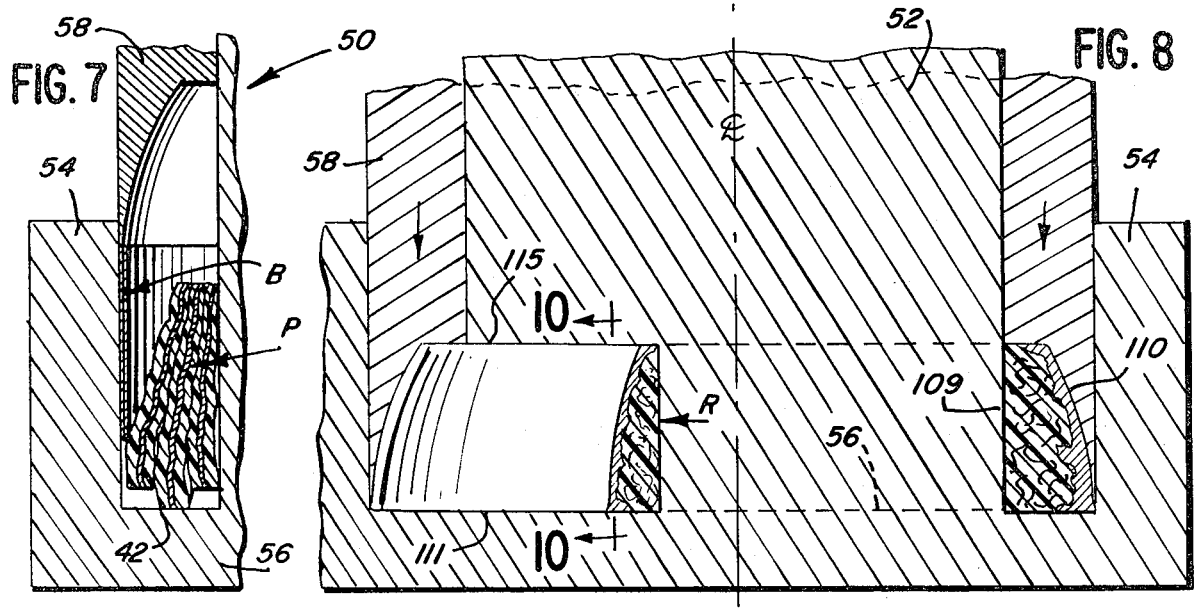
FIG. 7 is a fragmentary cross-sectional view of the graphite coil of FIG. 6 and the preform of FIG. 5 positioned to be assembled and integrated.
FIG. 8 is a cross-sectional view of the die assembly in which an exhaust ring of FIG. 1 may be joined juxtaposed with a formed exhaust ring of this invention.

As seen in FIG. 7, a further generally loose cylindrical body B of temperature resistant sealing material is formed and placed in the die assembly to provide a covering for and to be integrated with the preform P. Body B also should be of a low friction material which has desired compressibility characteristics and which is compatible with the operating environment. Body B is formed from a strip 60 of expanded graphite approximately 0.025 inch thick (dimension X'), about 16 inches long (dimension Y') and about 13/16 inch high (dimension Z'). The strip 60 is wound into a coil form, body B, having a diameter of about 2.5 inches. Body B is then positioned in the mold assembly, generally in the position shown in FIG. 7.

Thereafter, mold member 58 is actuated, as hydraulically, and acts axially to form the finished exhaust ring R. It forces and extrudes the expanded graphite sealing material into a relationship with the preform P under high pressure, as with a load of 40 to 60 tons, and preferably about 50 tons, such that the covering of graphite overlies the outer surface 110 of the exhaust ring, as well as portions of the base 111 and upper surface 115 of the lower and upper surfaces, of a thickness and distribution sufficient to provide sealability and wear resistance, and antifriction or lubricating characteristics. The tonnage used to compress the gasket should be high enough to minimize the possibility of delamination of the graphite covering. The cylindrical foot 42 on preform P is, as seen, eliminated during the second pressing operation, but was adequate to allow the expanded graphite to enter the edge zone at the base of the gasket assembly during the second pressing operation.

Thus, as seen in FIG. 8 and 10, the second pressing operation serves substantially to deform and relocate the metal core material, so that it is displaced irregularly and so that the facing material is displaced and redistributed. The sealing or covering material, the graphite, is compressed and densified and is forced and extruded into material into the crevices, faults, voids and valleys 44 of the surface 40 to provide an irregular inner surface substantially conforming to the core surface and a smooth covering surface. In that manner, the preforms P and B are integrated into the unitary ring R with the core mechanically linking the surfacing and core surface to each other. It is apparent that the graphite covering is secured to the preform as a result of mechanical clinching forces and high combining pressures. Of course, the surface of the finished ring or gasket assembly is smooth and regular, and also readily conforms to and accommodates to the mating parti-spherical surface 108 with which it is to form the sealed articulatable joint.

A suitable expanded graphite material is available from Union Carbide Corporation under the name Grafoil. The Grafoil used is about 80% graphite and has a density of about 70 pounds per cubic foot. It is essentially devoid of binders, resins and additives. It has about 20% ash.

A typical finished exhaust ring R made of materials having the dimensions indicated, under the conditions stated and in the dies described has a height of about 0.512 inch, an inner diameter of about 2.02 inch, a base 111 about 0.29 inch along the radius and an upper edge of about 0.135 inch along the radius. The radius of curvature of surface 110 is about 1.3 inches and the outside diameter of the ring R at its base is about 2.6 inches.

It will be apparent that sealing rings for purposes other than serving as exhaust rings may be made in accordance with the present invention. Further, core materials other than those described may be used and other or auxiliary means for providing and adding suitable roughness, crevices, voids and the like to promote adherance may be used as well.

It will also be apparent from the foregoing that further modifications may be made without departing from the spirit and scope of this invention. Accordingly the scope of the invention is to be considered as being limited only insofar as may be made necessary by the claims.

What is claimed is:

1. A method of forming a high temperature resistant sealing ring comprising the steps of
   forming a loose coil of a first height from a strip of heat-resistant material,
   placing said coil in a first die and axially compressing the coil under a first lower pressure into an annular preform of a second height having a plurality of crevices in a surface thereof,
   placing said preform in a second die,
   placing temperature resistant sealing material in said second die juxtaposed with said preform,
   axially compressing said preform and said sealing material under high pressure to force said sealing material into said crevices in said preform surface, to reduce the height of said cylindrical preform to a third height, to substantially deform said preform and said sealing material, and to form a smooth sealing material surface at said preform surface, thereby to provide an improved sealing ring.

2. The method in accordance with claim 1 in which said loose coil is formed from a strip of heat-resistant material having a tanged central core and at least one facing layer of a temperature resistant, predominantly inorganic material secured thereto.

3. The method in accordance with claim 2 in which said annular preform is formed in said first die to provide a base intersecting said surface, said base having downwardly projecting foot means centrally of the base.

4. The method in accordance with claim 3 in which said sealing material is formed into a second preform, and said second preform is positioned in said second die about said first preform, and wherein said axial compression in said second die forms said smooth sealing material surface on the outer surface of said sealing ring and on at least a portion of the base of said sealing ring between said outer surface and the location at which said foot means was positioned.

5. The method in accordance with claim 4 in which said sealing material preform is a loose coil of graphite.

6. The method in accordance with claim 2 in which said strip comprises a flat, tanged metallic core to which said facing is secured, and in which said preform comprises a buckled metallic core and a buckled facing layer after said first axial compression and in which, after said second compression, said metallic core is further upset and displaced irregularly.

7. The method in accordance with claim 6 wherein said sealing material is disposed on the outer surface of said sealing ring and said outer surface is parti-spherical in configuration.

8. A method of forming a temperature-resistant generally annular gasket assembly comprising the steps of:
   forming a annularly-shaped, rough-surfaced preform having crevices in at least one surface thereof from a coiled strip of temperature-resistant material by axial compression of said coiled strip under relatively low pressure,
   positioning said preform and sealing material in a die for providing a sealing surface layer for said gasket assembly,
   axially compressing said sealing material and said preform together in said die under relatively high pressure, thereby to force said sealing material into said crevices to integrate said preform and said material to form a gasket assembly having a covering layer of said sealing material at the surface of said gasket assembly.

9. The method in accordance with claim 8, comprising the further step of forming said coiled strip from a strip of heat-resistant material having a tanged central core and at least one facing layer of a temperature-resistant predominantly inorganic material secured thereto.

10. The method in accordance with claim 9 in which said annular preform is formed to provide a base intersecting said preform surface, said base having downwardly projecting foot means centrally of the base.

11. The method in accordance with claim 10 in which said sealing material is formed into a second preform, and said second preform is positioned in said die about said first preform, and wherein said axial compression in said die forms said smooth sealing material surface on the outer surface of said gasket assembly and on at least a portion of the base of said gasket assembly between said outer surface and the location at which said foot means was positioned.

12. The method in accordance with claim 8 in which said strip comprises a flat, tanged metallic core to which said inorganic facing is secured, and in which said preform comprises a buckled metallic core and a buckled facing layer after said first axial compression and in which, after said second compression, said metallic core is further upset and displaced irregularly.

13. The method in accordance with claim 12 wherein said sealing material is disposed on the outer surface of said gasket assembly and said outer surface is parti-spherical in configuration.

* * * * *